United States Patent [19]

Pease

[11] Patent Number: 4,852,292

[45] Date of Patent: Aug. 1, 1989

[54] CABLE TERMINAL

[75] Inventor: Eugene D. Pease, Muskegon, Mich.

[73] Assignee: Armstrong International, Inc., Three Rivers, Mich.

[21] Appl. No.: 225,731

[22] Filed: Jul. 29, 1988

[51] Int. Cl.$^4$ .............................................. A01K 91/00
[52] U.S. Cl. ........................................ 43/27.4; 43/43.1
[58] Field of Search ................... 43/43.1, 27.4, 43.12, 43/6.5, 44.83

[56] References Cited

U.S. PATENT DOCUMENTS

| 2,151,609 | 3/1939 | Menderman | 43/44.83 |
| 2,183,414 | 12/1939 | Smith | 43/43.1 |
| 2,748,524 | 6/1956 | Schinzel | 43/44.83 |
| 3,922,808 | 12/1975 | Rieth | 43/27.4 |

Primary Examiner—Gene P. Crosby
Attorney, Agent, or Firm—Miller, Morriss and Pappas

[57] ABSTRACT

A cable terminal formed in one piece in resin or plastic material providing a clam shell structure with integral hinge and which closes on a tortuously provided cable in and passages through the structure whereupon closure locks or latches the clam shell cable tautly into the terminal structure and closing a cable gripped bail element on selected rigging. A cap fits over the closed and locked terminal in the form of a terminal shroud or cover.

7 Claims, 1 Drawing Sheet

U.S. Patent   Aug. 1, 1989   4,852,292
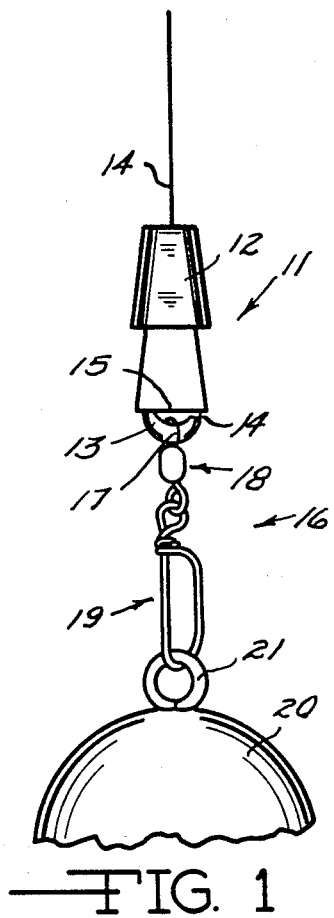
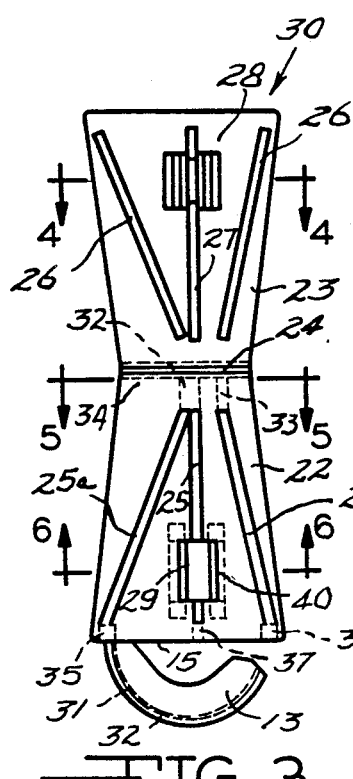
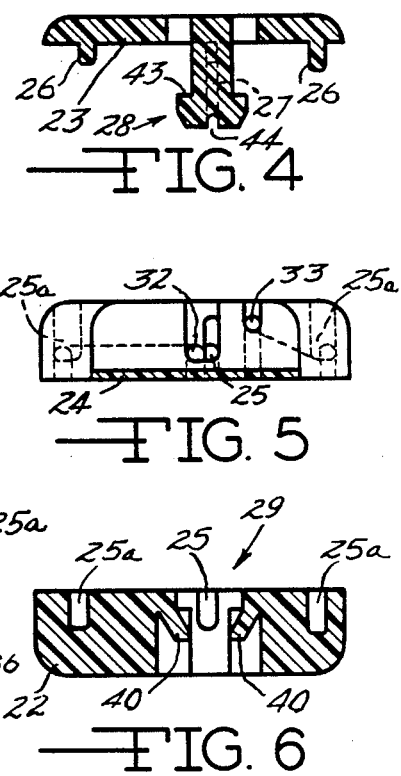
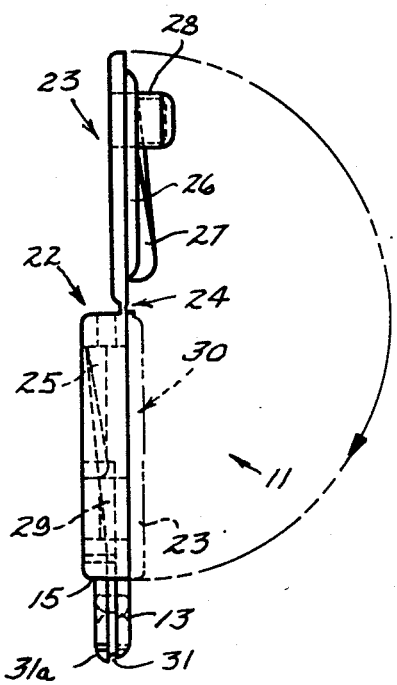
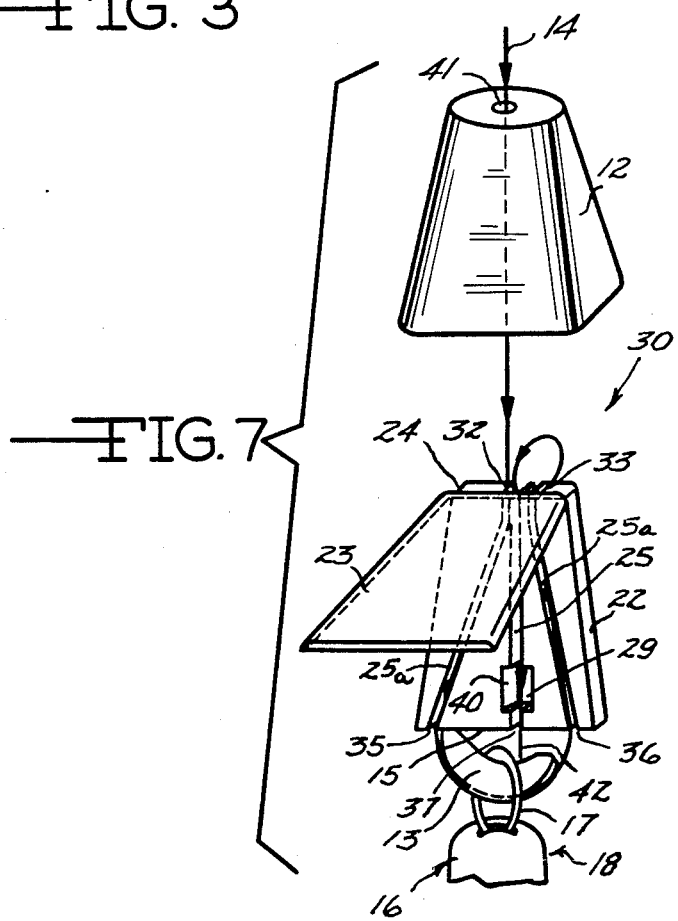

CABLE TERMINAL

The present invention is directed to a cable terminal connector element especially useful in downrigger fishing for connection of the downrigger line or cable to the cannon ball or weight which is dropped overboard and trailed as in trolling at the end of a strong metal line or cable. The weight carries the lure to a fishing depth and the lure line detaches from the weight upon a fish striking the lure which lure runs behind the ball. The lure line, when freed from the weight, is attached to a fishing rod and reel at the surface and the fish is then "played" in a conventional manner.

Heretofore downrigger cable has been variously connected to the downrigger striker weight, ball, or flash weight. The cable is usually plural stranded metal, is relatively stiff and, unless swaged lead or lead-alloy connectors were used, the connection was difficult to make and required special swaging tools to achieve the preferred attachment of cable to a snap swivel so as to avoid turning or spinning the cable in use and to facilitate disconnect between the line or cable and the cannonball or weight. The connections in many instances resulted in lost weights and, in the instance of a broken downrigger cable, prior connections presented an exasperating rerigging ordeal for the downrigger fisherman. The present invention provides a clam-shell molded form of connector in tough durable plastic material internally configured to tortuously receive the cable adjacent the terminal end so that, upon secure mating closure of the clam shell structure on the threaded cable, the tension on the downrigger cable in use achieves a firm and increasingly strong grip on the plastic or resin material on the cable. The present invention plays the stresses in the connector or terminal against the cable undulations and the resin material of the terminal and retains the cable against chance separation from the snap swivel or weight. This allows the downrigger fisherman to make the connection to the weight at sea, to rerig the downrigger in the event of a broken line or cable; and to be assured that a connection substantially as durable as the cable itself is filling the connector need in a neat, efficient and speedy manner. Also, as will be seen, no tools are required and manual closure of the clam-shell structure on the cable accomplishes the connection.

The device is economical to manufacture and easy to use without reliance on special equipment or unusual application of high pressure. The device obsoletes knotting of the cable. Cumbersome and unreliable cable clamps and the like are avoided. Also, the terminal connector of the present invention avoids the sharp tag-end burrs of frayed cable strands.

Accordingly the principal object of the present invention is a novel, useful and non-obvious structure providing a simple terminal connector in one piece that does not diminish the strength of the cable at the point of connection.

Another object is to provide an economically produced terminal structure for downrigger cable and the like which plays the strength of the cable strand against the resin material of the terminal element in an effective interlock achieved by the selected convolutions urged by the one-piece structure.

Other objects including economy and easy availability for usage in the field will be appreciated by fishermen, yachtsmen and the like who share a common problem of connecting metal cable to ancillary rigging at the terminal end of the cable.

Applicant is unaware of any such terminal connector for cable or the like in the prior art and is familiar with a substantial range of cable connection problems.

In the drawing:

FIG. 1 is a fragmental side elevation view of a cable terminal connector installation attached to the end of downrigger cable and secured to a snap swivel. The snap swivel is detachably connected to a cannon ball or weight as used in downrigger fishing and a conic cover sheath is on the cable and extends to matingly cover the upper end of the terminal connector.

FIG. 2 is a side elevation view of the terminal connector seen in FIG. 1 in an open full view and indicating the terminal connector in closed condition in phantom line as when the terminal connector closes and locks the cable in the connector.

FIG. 3 is a front elevation view of the open terminal connector described in FIG. 2 and as seen in closed condition in the FIG. 1.

FIG. 4 is a full cross section elevation view taken on the line 4—4 of FIG. 3 of one side of the clam shell terminal connector structure.

FIG. 5 is a full cross section elevation view taken on line 5—5 at and through the integral hinge between the closure shell portion of FIG. 3 and the receiver shell portion of the cable terminal connector.

FIG. 6 is a full cross section of the receiver shell portion of the cable terminal connector and indicating the entry lock detent provisions for accepting and latching or receiving and securing the tang closure element of the closure shell plate seen in FIG. 4.

FIG. 7 is an exploded assembly on the cable or line and indicating the rigging of the cable in the connector structure preliminary to closure and best illustrating stress loading of the cable in which the stresses are passed from the load through the terminal structure material and directly into the cable extension. The shroud or cap is threaded on the cable and is poised for cover of the terminal where the cable enters the terminal.

GENERAL DESCRIPTION

In general the terminal connector of the present invention is for cable such as downrigger cable and is a clam shell structure of two integrally connected delta shaped plates. One plate, the closure plate, closes in a registering manner on the other or receiving shell or plate. The receiver plate has passages or grooves patterned to register with lands or raised surfaces in the closure plate. Between the two plates there is an integral hinge positioned to assure the registering closure of the plates and permitting the entire unit to be molded or, preferably, precision formed as by injection molding. When the two plates are closed via the living hinge between the two plates the latch connection between the plates prevents reentry or opening of the connector without special tools or instruments capable of opening the latch. When closed, the device resembles a clam shell since the outer profile then is somewhat like a pair of mating shell units enclosing the passageways, and the small tracks or grooves of the passageways are configured to selectively grip or seize the cables to stress against themselves, by the resin deformation, and to assure that the cables are confined against displacement in such a manner that the terminal connector element in its closed position on the cable provides a gripping bail reinforced by the cable and upon closing the cable is drawn up into the terminal and with it a bail portion is lifted into contact with the base of the terminal. The bail portion provides a connection securely attached to the snap swivel. A cap is provided through which the cable passes and the cap is slid into taper mating contact with the terminal element. The bail is usually through the closed loop of a snap swivel as will be seen.

SPECIFIC DESCRIPTION

Referring to the drawings and with first specific reference to the FIG. 1 a cable connector terminal 11 is shown covered by a cap or shroud 12. The connector 11 includes a bail extension 13 which is buttressed by the cable 14 extending out of the terminal 11 around the bail 13 which is secured at one side to the base portion 15 of the terminal 11 and thence locks into the terminal 11. When the terminal 11 is closed (upon rigging) the cable 14 passing through the terminal draws the bail 13 upwardly and substantially against the base 15 of the terminal element 11. When closed as seen upon a snap-swivel 16 the eye 17 of the swivel 18 is secure against accidental release. The snap portion 19 of the snap swivel 16 provides a disengaging means for rigging here seen as the down rigger ball or weight 20 which usually includes the extending connector ring 21 as shown. By using the snap swivel 16 it will be appreciated that twisting movement in fishing procedures is avoided and this eliminates line snarls. In the FIG. 1 the terminal 11 is seen as having the frontal view of a tapered element as in the profile of a truncated cone.

By reference to FIG. 2 it will be appreciated that the terminal 11 is a one-piece device especially and internally channelled to admit cable 14 in a pattern dictated by the positioning depth and direction of the truncated cone 11, which when opened presents two portions, the receiver portion 22 and the closure portion 23 and both integrally connected by the living hinge or membrane 24. The receiver portion 22 includes ramped and configured channelled openings 25 and provides a female receptacle into which the configured lands 26 and 27 nest in a close fit against cable 14 runs provided in the receiver 22. Similarly, the male detent protruberance 28 in closure portion 23, upon closure, plunges into a detenting orificial constriction 29 in reciever 22 thereby securing the closure portion 23 against dislodgement. Accordingly, the portions 22 and 23 together and with their orienting hinge 24 form upon closure a latched clam-shell like structure 30. The phantom line directional arc of FIG. 2 commences with the open form and closes the clam shell structure 30 in phantom line of portion 23 closed on receiver portion 22 in full line. Integral with and depending from the base portion 15 of the receiver 23 is the bail 13 channelled at 31 to receive cable 14 and the bail 13 having raised cable control flanges 31a. As seen in the FIG. 1 the bail 15 is integral with the base of the receiver 22 on one side.

By reference to FIG. 3 the opening or passage 25 which receives the tapering land 27 is shown and the flanking lands 26 are shown which register and nest in the opening or passages 25a (not clearly discernible in the FIG. 2). FIG. 2 indicates the profile of lands 26 and 27. Openings 32 and 33 through the top wall 34 of receiver 22 provide access for the cable 14 as will be seen. Openings 35, 36 and 37 through the base 15 of the receiver 22 provide access passages or openings for the cable 14, which, as will be seen, leaves the receiver 22 through opening 35, passes confinedly through the channel 31 in the bail 13 and reenters the receiver 22 at opening 36 and eventually the cable 14 tails out of the opening 37 and bridging the detent opening 29. Upon closure of the clam shell structure 30 the protruding detent element 28 in the closure element 23; plunges into the detenting orificial construction 29 carrying the cable 14 and drawing all cable 14 snuggly into the passages 25 and 25a and the cable 14 is locked by the ramped simultaneous registering engagement of the lands 26 and 27 in the passageways 25a and 25.

Referring to FIG. 4 the cross section at line 4—4 best describes the closure element 23 at the detent protruding element 28 with tapered entry surfaces which spread corresponding flank latch shoulders 40 in the detent opening 29 and is grooved to capture the cable 14. The central land 27 is visible in phantom line.

In FIG. 5 taken through the integral hinge 24 indicates the entry passages 32 and 33 and the ramping of the floor of the passages formed in receiver element 22 of the clam shell structure 30.

FIG. 6 best describes the detent portion or opening 29 in the receiver 22 and the latch shoulders 40 on flanking sides of the opening 29 will be understood to close and lock on the latch shoulders 43 (FIG. 4) of the detent protusion 28. The tapered head of the protrusion 28 as previously described parts or separates the latch shoulders 40 at entry. Here the passage 25 is also visible as it leads into the opening 29.

FIG. 7 indicates the simplicity of rigging the clam shell structure 30 of the present invention to the fishing end of the cable 14. The clam shell structure of FIG. 3 is open and is partially folded on the integral hinge 24. The cable 14 is cut at the end where the connector terminal 14 is to be connected and the end of the cable 14 is threaded through the opening 41 in the generally conic cap or shroud 12. Then the cable end is started in the opening 32 in the receiver plate 22 diagonally through the ramped and channelled opening 25a, out of the base 15 of the receiver 22 at opening 35, around the bail 13 (holding the snap swivel 16 at the eye 17) and into passage 25a at opening 36, thence through opening 33 adjacent hinge 24 at upper edge of the clam shell structure 30 and then axially through the ramped channel opening 25 and tailing out of the receiver 22 at the terminal end 42 of cable 14. Then, the clam shell structure can be closed by detentably snapping and latching the closure plate 23 registrably against the receiver plate 22. The ramped undulating openings 25 and 25a in cooperation with the closing tapered and undulating lands 27 and 26, respectively, close against the cable 14 drawing the terminal end 42 of the cable 14 into the clam shell structure 30 and closing the bail 13 against the base 15 of the clam shell terminal 11 as seen in FIG. 1. The cap or shroud 12 is then pressed downward over the terminal 11 and the inner surfaces (not seen) are preferably serrated in the manner of barbs and are inclined against removal against the outer surfaces of clam shell structure 30 as engaged by the cap 12. The cap eliminates weed fouling against the connector 11 and such fouling creates holding compression against the clam shell structure 30. As will be appreciated, upon closure of the clam shell structure 30 the male protuberance 28 is inserted in the detent opening 29 and the detent lock surfaces 40 close and shoulder against the flanged portions 43 of the element 28 against removal and the slot 44 cradles the cable 14 upon closure. With special tooling the clam shell structure 30 can be opened. Each opening tends to fatigue the plastic or resin material of the integrally constructed cable connector terminal 11. Best practice is to cut off the cable above the connector terminal 11 and discard the used terminal 11 or to open the terminal 11 and throw away the fatigued terminal weakened from the process of opening. The preferred resin or plastic material is nylon or equivalent resin material yielding good molding results and good mechanical toughness with some resilience sufficient to close the detents and to maintain rigidity to secure and shape the cable 14 in the undulation of the grooves or channelling seen in reference numerals 25 and 25a when the ramped elements 26 and 27 press upon the cable 14.

In operation, especially in downrigger fishing, the present invention is easily installed, is economic in use, and durable and tough under difficult fishing conditions. Minimization of parts by integration and integral hinging has been hailed as a significant and unobvious advance in downrigger fishing.

Having thus described the best mode of manufacture and practice of the terminal connector of the present invention those skilled in the art will appreciate changes, modifications and improvements within the skill of the art and such changes, modifications and improvements are intended to be included within the spirit of the described invention limited only by the scope of the hereinafter appended claims.

I claim:

1. A cable terminal requiring no knots or radical deformation in the cable comprising:
    a plastic clam-shell type connector having a pair of shell plates and an integral hinge controlling closure of a first of said pair of shell plates upon a registering second receiving of said shell plates, said shell plates having passages defined therein with integral cable securing and confinement means engaged on said shells with said cable upon closure, and an integral deforming bail portion closed under stress by said cable as secured within said clam-shell connector.

2. A clam shell type connector for cable as described in claim 1 wherein said passages describe an entry for said cable substantially on the longitudinal axis of said connector, a first deviation from said axis to one end of said clam shell connector and said cable guideably in encircling support of said bail to a point in the plane of said axis and reentry to said connector and traveling diagonally through said connector and toward said axis in a relatively common plane, and an abrupt turn in said cable adjacent the entry passage for said cable for axial reentry and a final passage portion extending axially through said shell connector; and all of said passages for receiving said cable in a substantially common plane and locally undulating upon closure of said shell plates.

3. In the connector structure of claim 2 wherein said passages are partially entered by registering raised lands in said first plate of said clam shell and said first plate is detentably secured in said receiving plate and wherein upon latching of said plates upon closure said bail is stressed by said cable as tensioned against said clam shell structure.

4. A relatively flat and compact molded plastic bodied cable terminal for connection of cable to fishing apparatus such as a downrigger weight comprising:
    a first delta-shaped shell-like portion having plural raised land portions, a latch element, and a pair of lugs all protruding normally from the inside planar surface side of said first delta-shaped shell-like plate portion;
    a second delta shaped shell-like portion integrally and hingedly connected to said first shell-like portion at the narrowest edges thereof and having plural groove portions in operative relationship with said lands, a central opening including detent flanges, a pair of lug receiving openings with detent securing means, and said groove portions having top and bottom cover portions and access openings through the top and bottom cover portions and access openings through the top and bottom ends of said second shell-like portion into said grooves and said second shell-like portion having a planar principal surface, and an integral bail means extending from the lower edge of said second delta shaped shell-like portion in substantially tangential adjacent relation with two of said access openings;
    a hinge portion integrally connected to each of said shell-like portions whereby upon passing of the end of a cable through said openings in said second shell-like portion and grooves around said bail means, both into said passages and through said central opening, that upon closing said first shell-like portion on said hinge and plunging of said latch element into detent relation in said central opening of said second shell-like portion and said lugs into detent relation in said lug receiving openings, said terminal is secure upon said cable; and a cap is slid over the pair of closed shell like portions in a safety collar wedged over the delta-shaped shell portions.

5. A cable terminal for connection to the free end of fishing cables comprising:
    a pair of shell like plates having planar faces one of said plates in registering configuration with the other of said plates and one plate having plural lands and lugs rising above said planar face and a detenting latch element extending above said one plate, said other of said pair of plates having mating plural grooves in registering relation with said lands in said one of said plates and plural entries to said grooves from the ends of said other of said plates and beneath the planar face and having a central opening transversely through one of said grooves and said other of said plates and lug receiving openings, said openings in respective closing and detenting registry with said latch element and said lugs;
    a bail-like hook extension from one end of said plate having grooves in tangential outer perimeter relation to selected of said entries of said grooves;
    a hinge integrally formed with and between said pair of shell-like plates; and
    a mating cap for pressing down over said plates when said plates are mated detentably together over said cable threaded through said entries through said grooves, around said bail-like hook, back through said grooves and through said groove through which said central opening and said latch pass.

6. In the combination of claim 5 wherein said lands are non-uniform in height above the planar face and wherein said grooves have corresponding depth in registry with said lands and in convolution of said cable therebetween when said shell like plates are closed on said cable.

7. In the combination of claim 5, said shell-like plates, said hinge, and said bail-like hook, are integrally formed from a dimensionally stable resilient and tough thermo plastic resin material having good injection molding qualities.

* * * * *